Aug. 5, 1969     W. C. BARNARD ET AL     3,459,462
RECEPTACLE
Filed Oct. 4, 1967     3 Sheets-Sheet 1
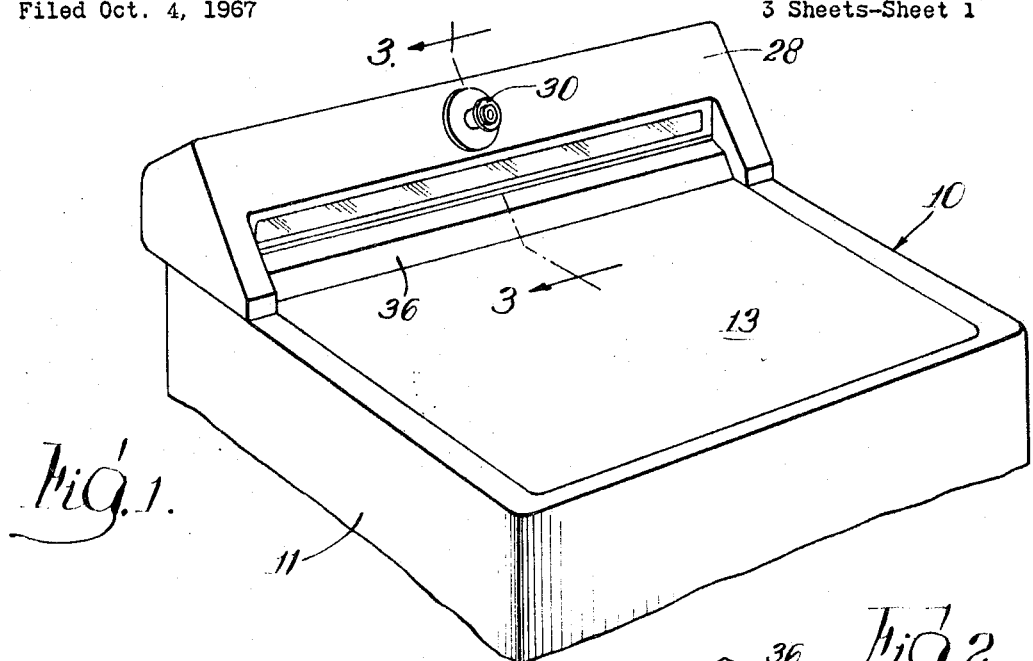
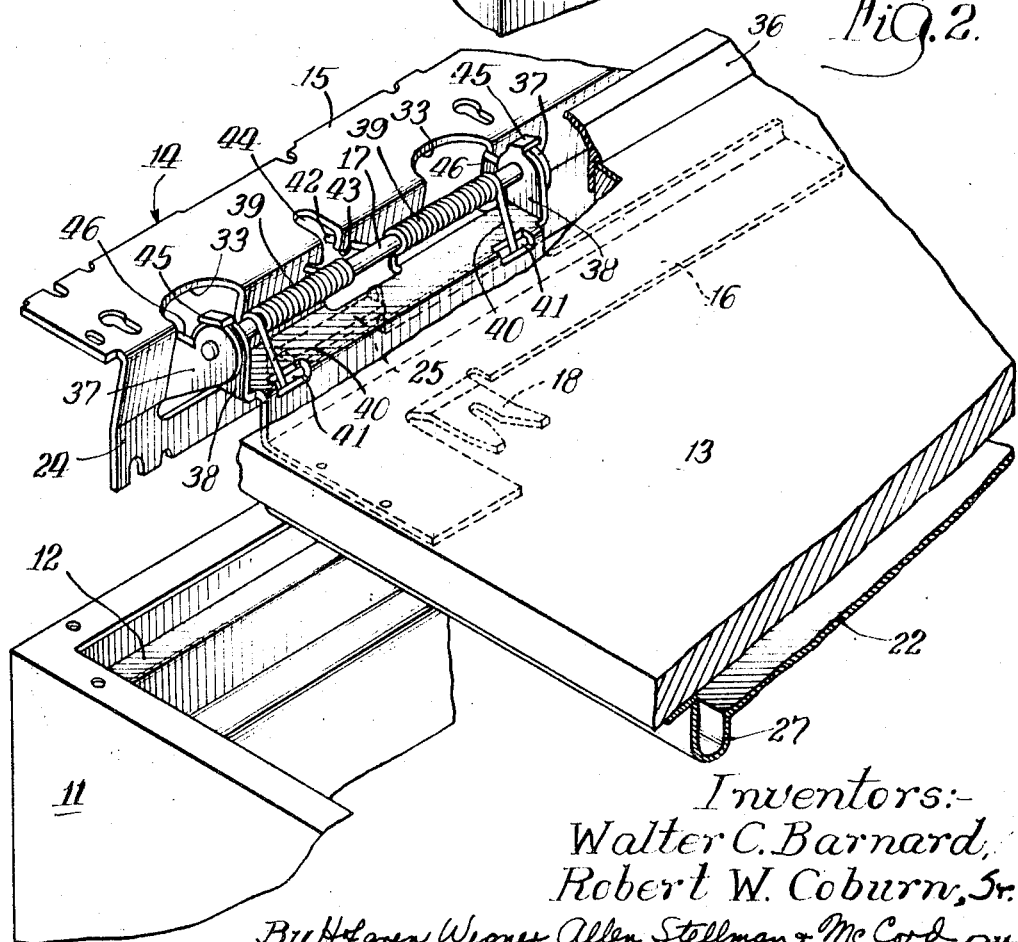
Inventors:-
Walter C. Barnard,
Robert W. Coburn, Sr.
By Hofgren, Wegner, Allen, Stellman & McCord Attys.

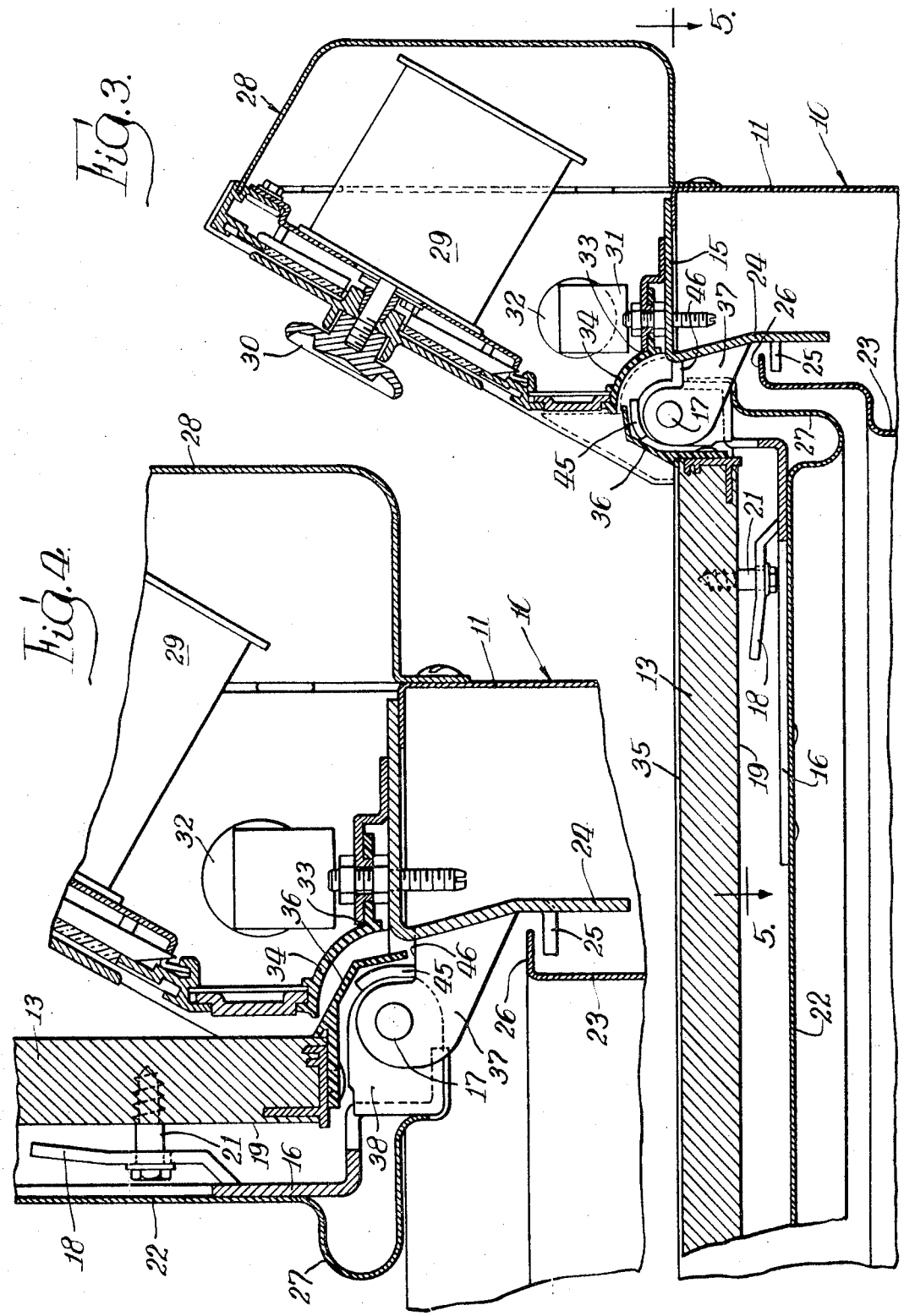

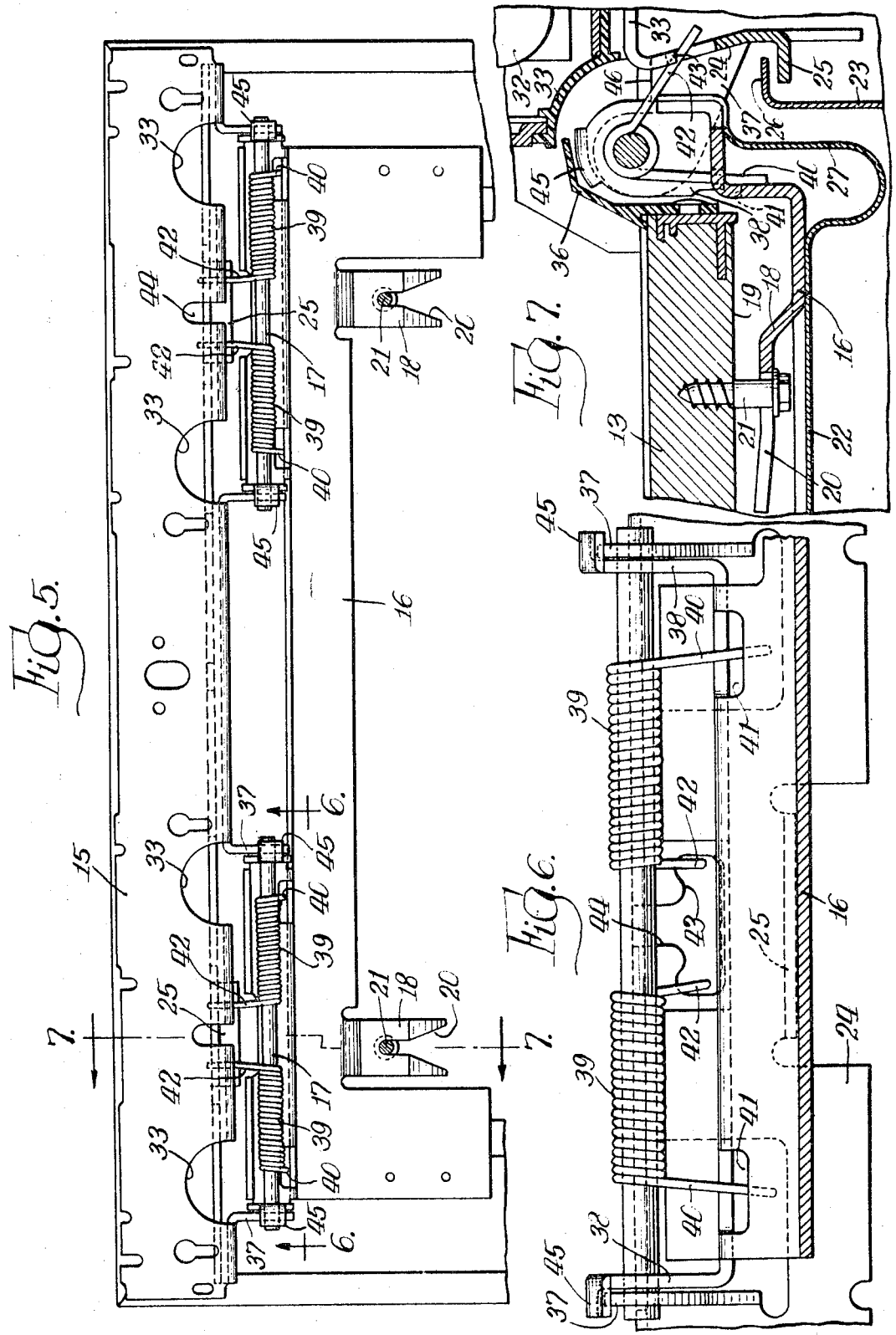

3,459,462
RECEPTACLE
Walter C. Barnard, White Bear Lake, and Robert W. Coburn, Sr., Minneapolis, Minn., assignors to Whirlpool Corporation, a corporation of Delaware
Filed Oct. 4, 1967, Ser. No. 672,752
Int. Cl. A47l 19/02; A47k 1/04
U.S. Cl. 312—228                    20 Claims

ABSTRACT OF THE DISCLOSURE

A receptacle having a hinged lid over an access opening including a hinge structure in which the rail of the hinge is attached to the receptacle and the bracket of the hinge is attached to the lid and the means for attaching the bracket to the lid includes spaced tongues integral with the bracket.

---

In the preferred structure the lid includes an inner liner secured to the bracket with the tongues being attached directly to the lid. In certain embodiments, and particularly where the receptacle is a part of a household appliance such as a dishwasher, the receptacle has an inner tub and the hinge rail includes supports for aiding in supporting this tub.

In one embodiment of the invention the receptacle is an electric appliance having an electric control console mounted on the rail. In one form of this appliance the console has an internal lighting fixture and the rail includes spaced openings for the passage of light from the console into the receptacle when the lid is open. In one embodiment of the invention the lid of the appliance is generally horizontal to provide a work surface and a guard means is provided at the edge of the lid adjacent the hinge to intercept loose foreign material such as crumbs sliding from the surface into the receptacle when the lid is in the process of being opened.

The invention finds important application in an electrical appliance such as a dishwasher. Thus in the embodiment shown in the accompanying drawings a dishwasher is illustrated. In the drawings:

FIGURE 1 is a fragmentary perspective view showing the top of a dishwasher embodying the invention.

FIGURE 2 is an exploded fragmentary perspective view partially in section illustrating the relationship of the hinge to the receptacle of the dishwasher and the movable lid.

FIGURE 3 is a fragmentary sectional view taken substantially along line 3—3 of FIGURE 1.

FIGURE 4 is a view similar to FIGURE 3 but with the lid in the raised or open position.

FIGURE 5 is a plan view illustrating the hinge structure only of the invention taken substantially along line 5—5 of FIGURE 3.

FIGURE 6 is a fragmentary enlarged sectional view taken substantially along line 6—6 of FIGURE 5.

and 7. Struck from the bracket 16 adjacent opposite ends taken substantially along line 7—7 of FIGURE 5 and as such is an enlarged fragmentary detail of a portion of FIGURE 3.

In the illustrated embodiment the invention is shown as applied to a dishwasher 10 that includes the usual cabinet 11 forming a receptacle having a top access opening 12 normally closed by a movable lid 13.

The lid 13 is hingedly attached to the receptacle by means of a hinge 14 that includes an elongated rail 15 and a bracket 16 hingedly attached together about a pair of spaced aligned hinge pins 17.

The elongated bracket 16 extends downwardly and forwardly from the rail 15 and hinge pins 17 and extends forwardly beneath the lid 13 as shown in FIGURES 3 and 7. Struck from the bracket 16 adjacent opposite ends thereof are a pair of forwardly projecting tongues 18 that are raised from the remainder of the bracket 16 to be positioned intermediately between this remainder of the bracket 16 and the bottom surface 19 of the lid 13. Each tongue 18 is provided with a forward opening V-shaped recess or slot 20 for receiving the securing means embodied in the screws 21 for fastening the tongues 18 and thus the bracket 16 to the lid 13.

Attached to the bracket 16 is the lid liner 22 which forms the inside of the lid. This liner 22 and the bracket 16 are spaced inwardly of the inner surface 19 of the lid 13 a distance greater than the spacing of the tongues 18 so that the tongues are positioned between the liner 22 and inner surface 19 and spaced from each.

The illustrated receptacle is provided with a liner 23 that in the illustrated embodiment is the tub of the dishwasher 10. The rail 15 is provided with support for this tub 23. In the illustrated embodiment this support is located on a downwardly extending edge portion 24 in the form of a right angled flange forming a part of the rail 15. This support is embodied in a pair of forwardly extending flanges 25 on the edge portion flange 24 of the rail and with these support flanges 25 underlying an edge flange 26 on the receptacle tub 23.

In order to simplify the illustration the gasket that is located between the flanges 25 and 26 and between the bulbous edge 27 on the lid liner 22 is omitted. However, such a gasket is disclosed in the copending application Ser. No. 676,341, filed Oct. 18, 1967, assigned to the same assignee as the present application.

When the receptacle is an electric appliance such as the illustrated dishwasher there is preferably provided an electric control console 28 that is mounted in part on the hinge rail 15, as illustrated most clearly in FIGURES 3 and 4. This console 28 encloses the separate electric controls 29 that govern the operation of the dishwasher and with such control being operated by an external knob 30 in the customary manner. In order to simplify the illustration the dishwasher of the embodiment of the drawings shows only a single control and knob although, of course, the customary dishwasher may have more than one.

Located within the interior of the console 28 is a light fixture 31 for illuminating the customary controls in the customary manner. This internal light fixture 31 includes an elongated light bulb 32 that normally extends a substantial distance within the console 28. The console 28 as is shown in FIGURE 4 contains spaced openings 33 covered by transparent windows 34 through which light from the bulb 32 can shine into the interior of the receptacle tub 23 when the lid 13 is in raised position.

In the illustrated embodiment the lid 13 is on the top of the dishwasher so as to provide a work surface 35. Because it is a work surface frequently loose solid foreign material such as crumbs will be deposited thereon. In order to intercept these loose particles sliding rearwardly in and into the interior of the appliance when the lid 13 is hinged upwardly about hinge pins 17 there is provided at the rear end of the lid an upwardly extending guard 36. This guard is also preferably transparent so that light from the bulb 32 can shine into the interior of the tub 23 when the lid 13 is raised as shown in FIGURE 4.

In the illustrated hinge structure the rail 15 is provided with pair of spaced forwardly extending tabs 37 with each being adjacent an end of the rail as shown in FIGURE 7. These tabs 37 retain the ends of the aligned hinge pins 17. The hinge bracket 16 is provided with two pairs of similar hinge pin tabs 38 with each being located adjacent an inner surface of a rail bracket 37 and having an opening through which a hinge pin 17 extends. With this arrangement the tabs 37 and 38 in conjunction with the hinge pin 17 provide the hinge mounting of the rail 15 and bracket 16.

The bracket 16 of the hinge is constantly urged in upward or open position by spring means. In the illustrated embodiment this spring means is in the form of a pair of helical springs 39 for each hinge pin 17 through which the pin extends. One end 40 of each spring 39 is retained in an opening 41 in the hinge bracket 16 while the other end 42 of each spring is retained in an opening 43 in the hinge rail 15. This opening 43 is in the form of an inverted T located in the rail 15 adjacent each spring end 42 so that in applying the tension to the springs 39 the ends 42 may be moved down through the vertical portion 44 of the T opening and then laterally into the horizontal portion of the T.

In order to limit the upward movement of the lid 13 to a preselected position such as that shown in FIGURE 4 stops are provided. In the illustrated embodiment, as shown most clearly in FIGURE 2, these stops are laterally projecting stop elements 45 on the hinge bracket tabs 38 overlying the top of the hinge rail tabs 37. When the lid 13 is raised to its extreme upward position these stops 45 engage shoulders 46 on the rail tabs 37 to limit this upward movement as shown in FIGURE 4.

Having described our invention as related to the embodiment shown in the accompanying drawings, it is our intention that the invention be not limited by any of the details of description, unless otherwise specified.

The embodiment of the invenion in which an exclusive property or privilege is claimed is defined as follows:

1. A receptacle having a hinged closure, comprising: means forming an access opening in said receptacle; a movable lid for said opening; a hinge having an elongated rail attached to said receptacle adjacent one side of said opening and an elongated bracket hingedly connected to said rail; spaced tongues integral with said bracket and raised from the remainder of the bracket toward said lid; means securing said tongues to said lid; an inner lid liner; and means securing said liner to said bracket to enclose said bracket and the tongues.

2. The receptacle of claim 1 wherein said lid has an inner surface and said lid liner and bracket are spaced inwardly of said inner surface toward the interior of said receptacle.

3. The receptacle of claim 2 wherein said tongues are spaced inwardly of said inner surface of said lid and outwardly of said bracket.

4. The receptacle of claim 1 wherein said tongues have forward opening recesses receiving said means for securing said tongues to said lid.

5. The receptacle of claim 4 wherein said lid has an inner surface and said lid liner and bracket are spaced inwardly of said inner surface, and said tongues are spaced inwardly of said inner surface of said lid and outwardly of said bracket.

6. A receptacle having a hinged top closure, comprising: means forming an access opening in said receptacle; a movable lid for said opening; a hinge having a rail attached to said receptacle adjacent one side of said opening and a bracket hingedly connectd to said rail and attached to said lid; an inner receptacle tub; and support means on said rail for providing support for said receptacle tub.

7. The receptacle of claim 6 wherein said rail has an edge portion adjacent said lid and receptacle tub extending downwardly and said support means is located on said edge portion.

8. The receptacle of claim 7 wherein said receptacle tub is provided with an outwardly extending edge flange adjacent said opening, and said support means comprises support members on said edge portion underlying said edge flange.

9. The receptacle of claim 6 wherein there are provided spaced tongues integral with said bracket and raised therefrom toward said lid and means securing said tongues to said lid.

10. The receptacle of claim 9 wherein there are provided an inner lid liner and means securing said liner to said bracket, said lid has an inner surface and said lid liner and bracket are spaced inwardly of said inner surface and said tongues are spaced inwardly of said inner surface of said lid and outwardly of said bracket.

11. The receptacle of claim 10 wherein said tongues have forward opening recesses receiving said means for securing said tongues to said lid.

12. An electric appliance, comprising: a receptacle having an access opening; a movable lid for said opening; a hinge having a rail attached to said receptacle adjacent one side of said opening and a bracket hingedly connected to said rail and attached to said lid; and an electric console for said appliance mounted on said rail.

13. The appliance of claim 12 wherein said console is provided with an internal lighting fixture, and said rail includes means forming spaced openings between said fixture and access opening for passage of light rays therethrough into said receptacle when said lid is open.

14. The appliance of claim 12 wherein there are provided spaced tongues integral with said bracket and raised therefrom toward said lid and means securing said tongues to said lid.

15. The appliance of claim 14 wherein there are provided an inner lid liner and means securing said liner to said bracket, said lid has an inner surface and said lid liner and bracket are spaced inwardly of said inner surface and said tongues are spaced inwardly of said inner surface of said lid and outwardly of said bracket.

16. The appliance of claim 15 wherein said tongues have forward opening recesses receiving said means for securing said tongues to said lid.

17. The appliance of claim 16 wherein said console is provided with a internal lighting fixture, and said rail includes means forming spaced openings between said fixtures and access openings for passage of light rays therethrough with said receptacle when said lid is open.

18. The appliance of claim 12 wherein there are provided an inner receptacle tub and support means on said rail for providing support for said receptacle tub.

19. The appliance of claim 18 wherein said rail has an edge portion adjacent said lid and receptacle tub extending downwardly and said support means is located on said edge portion, said receptacle tub having an outwardly extending edge flange adjacent said opening, and said support means comprises support members on said edge portion underlying said edge flange.

20. The appliance of claim 12 wherein said lid is generally horizontal to provide a work surface, and there is provided an upstanding guard means at the edge of said lid adjacent said hinge for preventing loose foreign material on said surface falling from said surface into said appliance when the lid is opened.

References Cited

UNITED STATES PATENTS

| | | | |
|---|---|---|---|
| 2,321,753 | 6/1943 | King | 220—30 |
| 2,964,781 | 12/1960 | Morin | 16—189 X |
| 3,097,030 | 7/1963 | Hartley | 312—214 X |
| 3,150,408 | 9/1964 | Belsky | 16—189 X |
| 3,173,730 | 3/1965 | Collins | 312—223 |

CASIMIR A. NUNBERG, Primary Examiner

U.S. Cl. X.R.

16—162